(12) United States Patent
Boren

(10) Patent No.: US 9,573,685 B2
(45) Date of Patent: Feb. 21, 2017

(54) HANDRAIL APPARATUS FOR USE WITH VEHICLES

(71) Applicant: The Boeing Company, Chicago, IL (US)

(72) Inventor: Kelly L. Boren, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 746 days.

(21) Appl. No.: 13/797,060

(22) Filed: Mar. 12, 2013

(65) Prior Publication Data

US 2014/0264221 A1    Sep. 18, 2014

(51) Int. Cl.
| | | |
|---|---|---|
| *E04H 17/00* | (2006.01) | |
| *B64D 11/00* | (2006.01) | |
| *B60N 3/02* | (2006.01) | |
| *E04F 11/18* | (2006.01) | |

(52) U.S. Cl.
CPC ............... *B64D 11/00* (2013.01); *B60N 3/026* (2013.01); *E04F 11/1804* (2013.01)

(58) Field of Classification Search
CPC .... E04F 11/18; E04F 11/1802; E04F 11/1804; B64D 11/00; B60N 3/02; B60N 3/023
USPC .... 256/65.16; 182/49; 296/1.02, 71; 52/174, 52/184; 403/61, 112, 116
See application file for complete search history.

(56) References Cited

U.S. PATENT DOCUMENTS

| | | | | |
|---|---|---|---|---|
| 2,531,263 A | * | 11/1950 | Fink ........................ | B64C 1/24 |
| | | | | 105/447 |
| 2,990,148 A | * | 6/1961 | James ...................... | B64C 1/24 |
| | | | | 182/127 |
| 4,014,486 A | * | 3/1977 | Nelson ..................... | B64C 1/24 |
| | | | | 105/447 |
| 4,574,937 A | * | 3/1986 | Anderson ................. | B64F 1/32 |
| | | | | 182/106 |
| 5,116,025 A | | 5/1992 | Kiniry | |
| 5,143,324 A | * | 9/1992 | Cornelius ................ | B64C 1/24 |
| | | | | 182/88 |

(Continued)

FOREIGN PATENT DOCUMENTS

| | | |
|---|---|---|
| JP | H0373585 | 7/1991 |
| JP | H09111984 | 4/1997 |

(Continued)

OTHER PUBLICATIONS

Patent Cooperation Treaty, "International Preliminary Report on Patentability," issued in connection with PCT Patent Application No. PCT/US2014/011753, mailed on Sep. 15, 2015, 7 pages.

(Continued)

*Primary Examiner* — Michael P Ferguson
*Assistant Examiner* — Nahid Amiri
(74) *Attorney, Agent, or Firm* — Hanley, Flight & Zimmerman, LLC

(57) ABSTRACT

A handrail apparatus and method for use with vehicles are disclosed. An apparatus in accordance with the teachings of this disclosure includes a first coupling plate to be coupled to a monument of a vehicle, a second coupling plate to be coupled to the monument of the vehicle. The apparatus includes a handrail coupled to the first coupling plate and a support coupled to the second coupling plate and the handrail. The handrail is movable between a stowed position and a deployed position.

20 Claims, 13 Drawing Sheets

(56) References Cited

U.S. PATENT DOCUMENTS

| | | | |
|---|---|---|---|
| 5,422,794 A * | 6/1995 | Drake | B60Q 3/0233 |
| | | | 244/118.1 |
| 7,530,549 B1 | 5/2009 | Hansen et al. | |
| 7,942,367 B2 | 5/2011 | Saint-Jalmes et al. | |
| 2002/0095881 A1* | 7/2002 | Shreiner | E04F 11/1804 |
| | | | 52/184 |
| 2003/0029974 A1 | 2/2003 | Marshall et al. | |
| 2003/0126718 A1* | 7/2003 | Yamamoto | B60N 3/023 |
| | | | 16/110.1 |
| 2007/0200380 A1* | 8/2007 | Stolarczyk | B60N 3/026 |
| | | | 296/1.02 |
| 2009/0121515 A1* | 5/2009 | Shiono | B60N 3/026 |
| | | | 296/146.6 |

FOREIGN PATENT DOCUMENTS

| | | |
|---|---|---|
| JP | H10131452 | 5/1998 |
| JP | 2000265635 | 9/2000 |
| JP | 2001193251 | 7/2001 |

OTHER PUBLICATIONS

Patent Coooperation Treaty, "International Search Report," issued by the International Searching Authority in connection with PCT Application No. PCT/US2014/011753, mailed Apr. 14 2014, 6 pages.

Patent Coooperation Treaty, "Written Opinion," issued by the International Searching Authority in connection with PCT Application No. PCT/US2014/011753, mailed Apr. 14 2014, 5 pages.

* cited by examiner

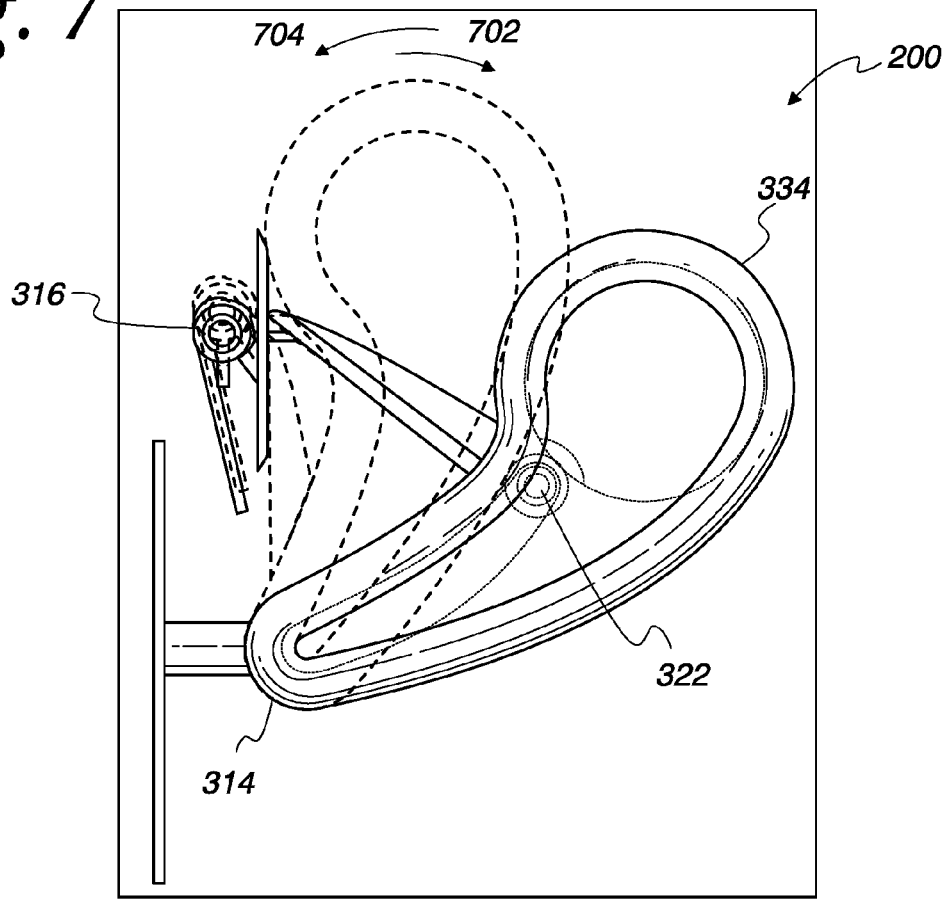
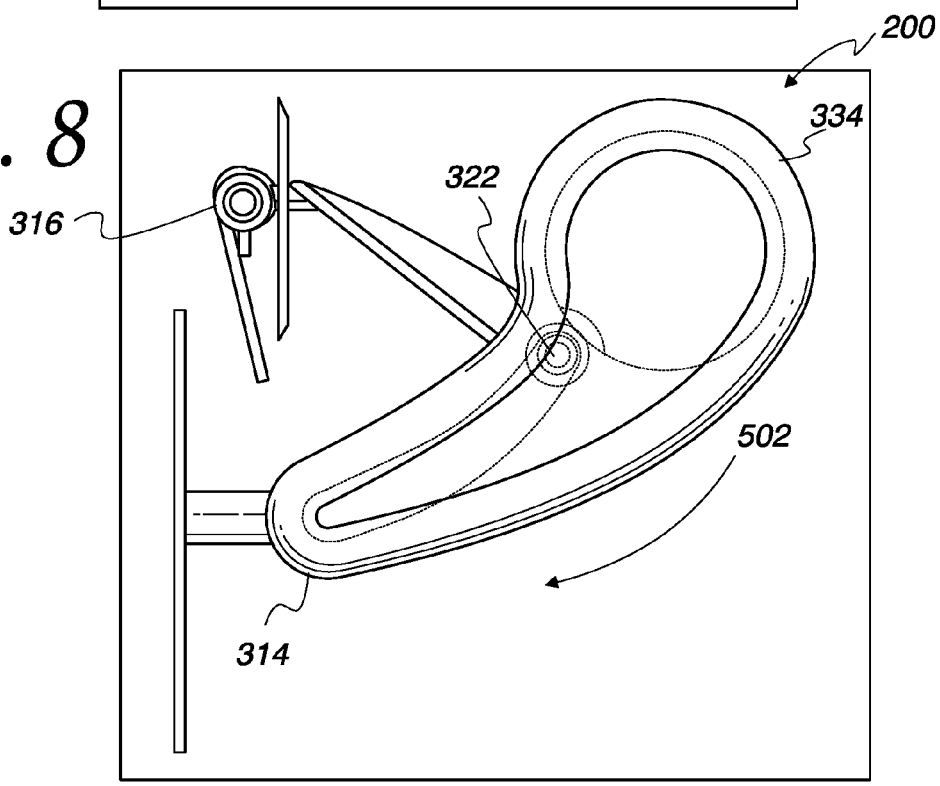

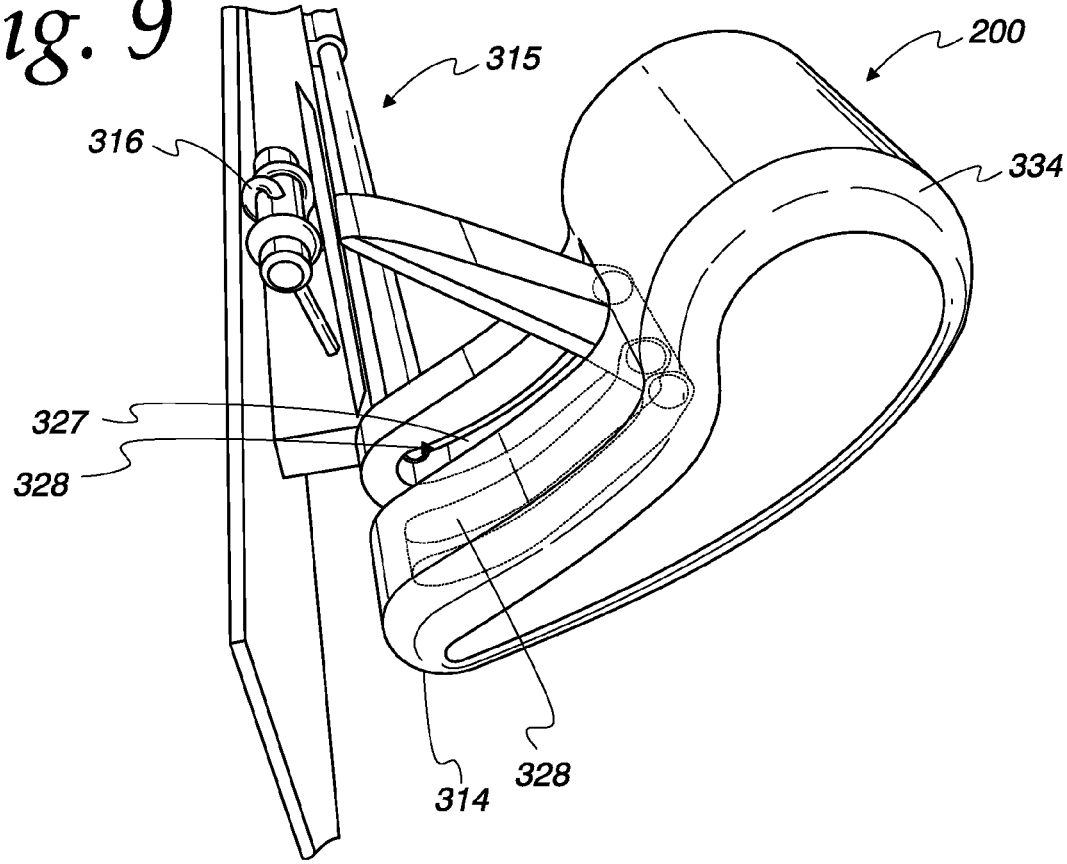
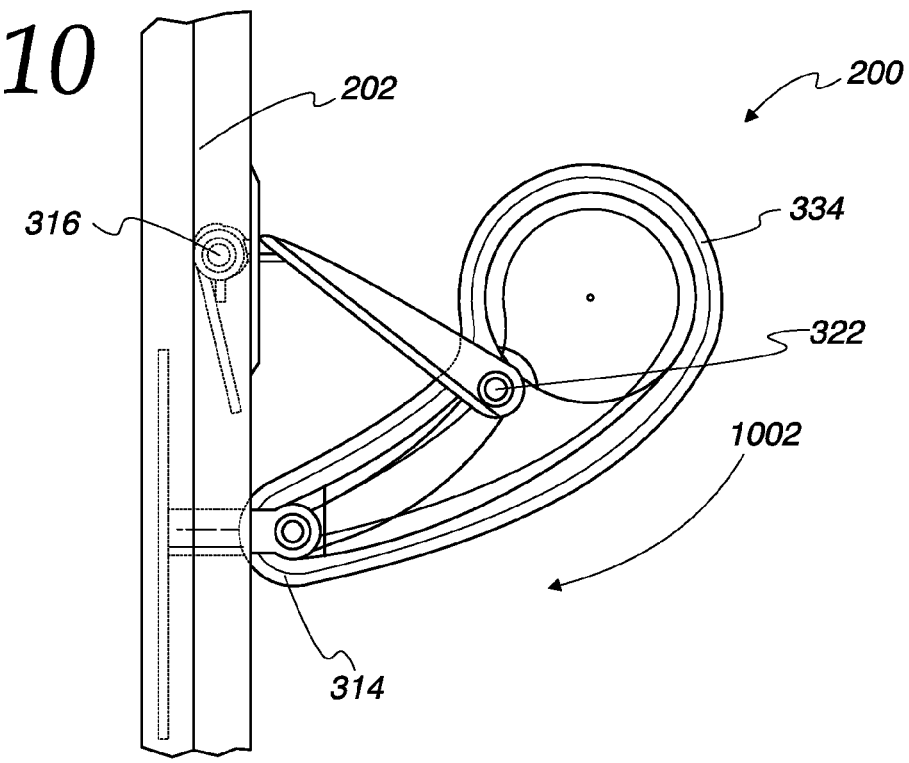

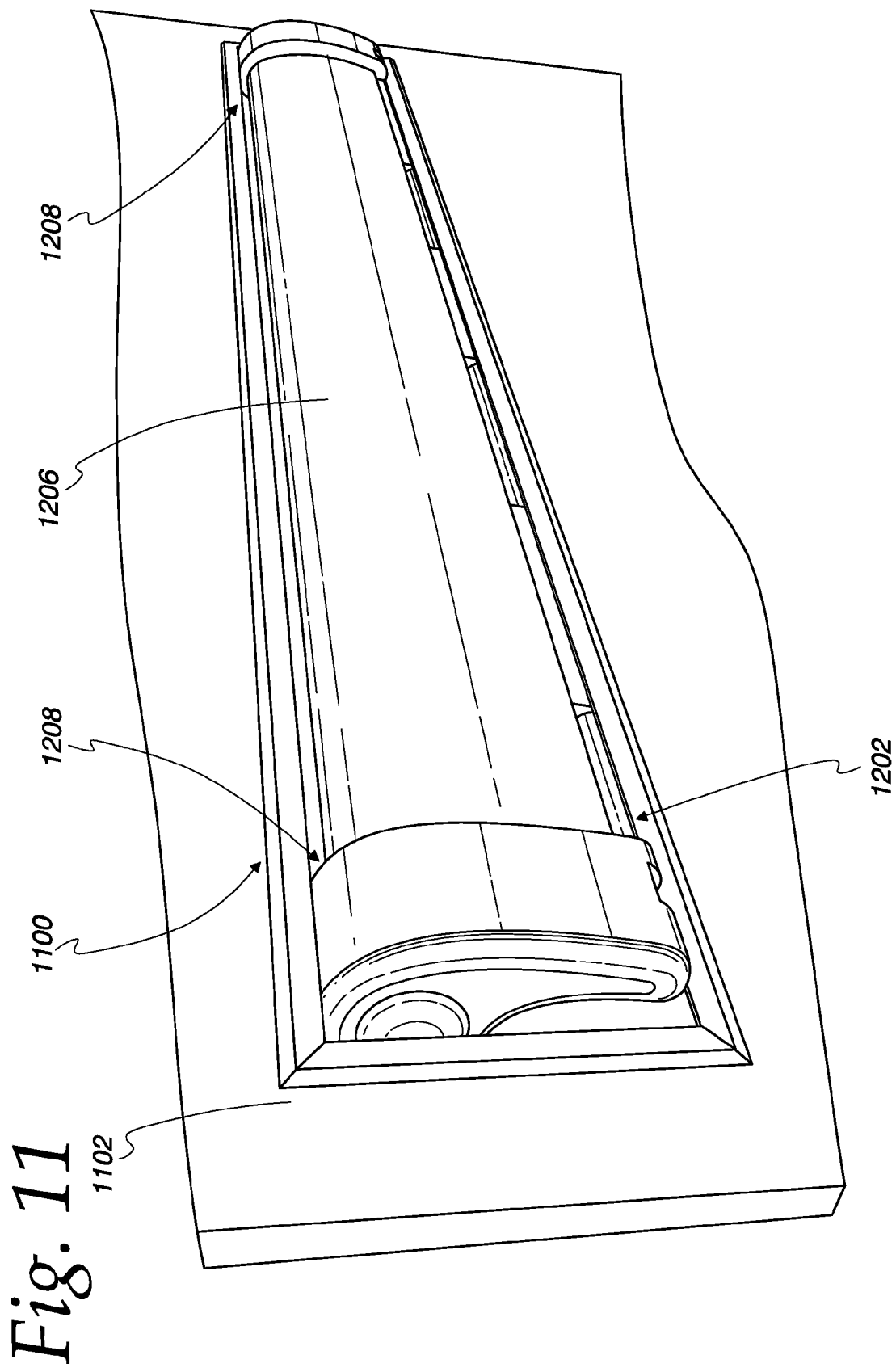

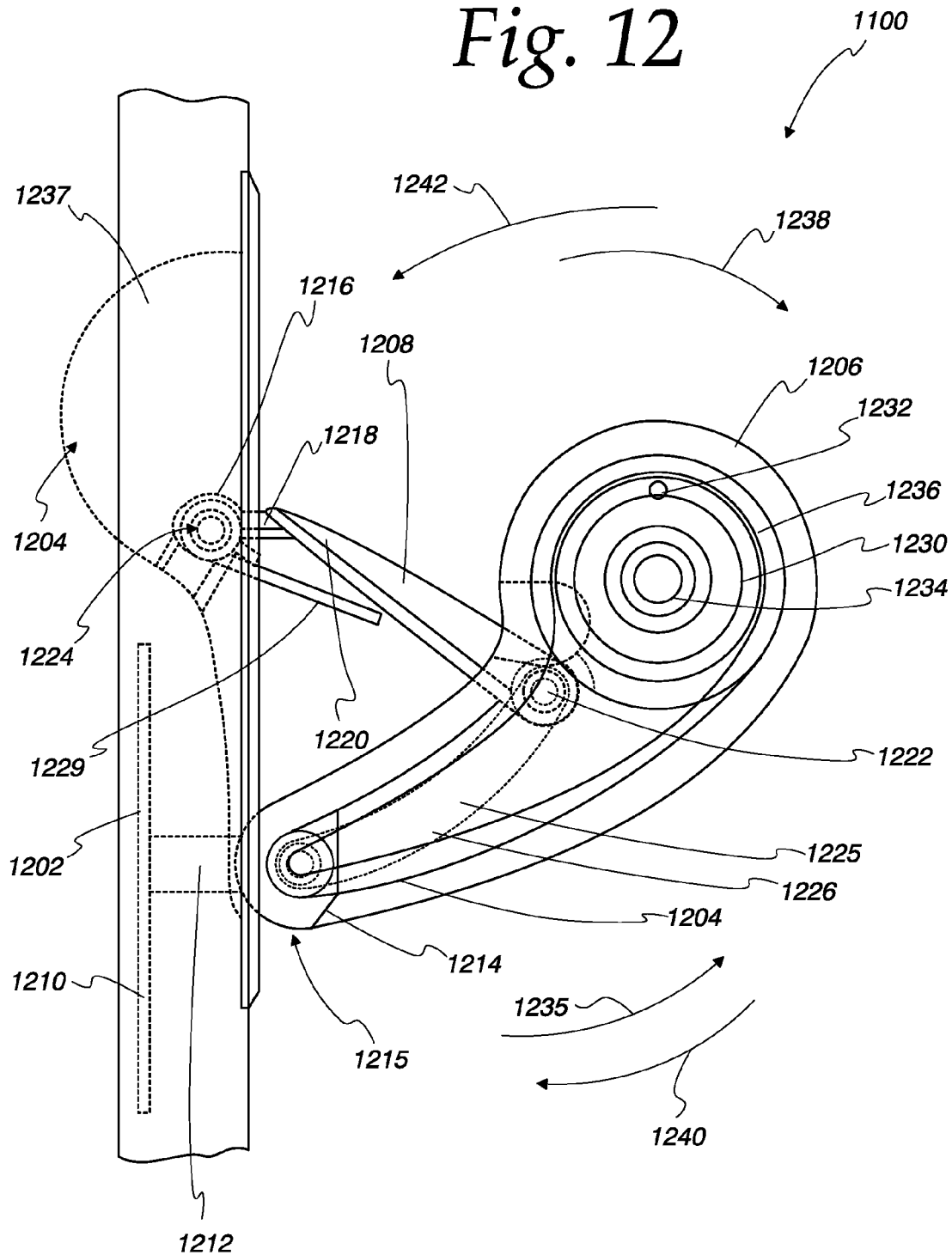

HANDRAIL APPARATUS FOR USE WITH VEHICLES

FIELD OF THE DISCLOSURE

This patent relates to handrail apparatus and, more specifically, to handrail apparatus for use with vehicles.

BACKGROUND

Handrails may be used to assist individuals when ascending or descending stairs. Handrails may also be used to provide stability to individuals when in a standing position.

SUMMARY

An apparatus for a vehicle in accordance with the teachings of this disclosure includes a handrail configured to provide a thin profile when in a stowed position. The handrail is movable between the stowed position and a deployed position. The apparatus includes a plurality of latching mechanisms and a plurality of posts having a first end affixed to the handrail and a second end affixed to the plurality of latching mechanisms.

An apparatus in accordance with the teachings of this disclosure includes a first coupling plate to be coupled to a monument of a vehicle and a second coupling plate to be coupled to the monument of the vehicle. The apparatus includes a handrail coupled to the first coupling plate and a support coupled to the second coupling plate and the handrail. The handrail is movable between a stowed position and a deployed position.

An example method for operating a handrail apparatus in accordance with the teachings of this disclosure includes disengaging a plurality of latching mechanisms, pivoting a handrail of the handrail apparatus about a fixed axis from a stowed position to a deployed position and engaging the plurality of latching mechanisms to lock the handrail in the deployed position.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 2-10 depict different views of an example handrail apparatus in accordance with the teachings of this disclosure.

FIGS. 11-15 depict different views of another example handrail apparatus in accordance with the teachings of this disclosure.

DETAILED DESCRIPTION

Figure 1:
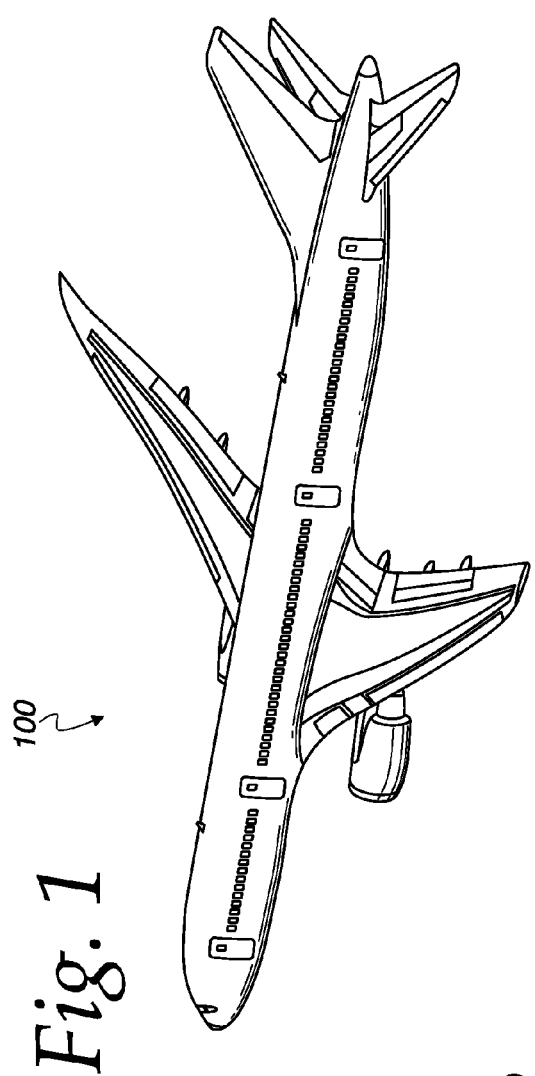
FIG. 1 depicts an example airplane within which the example handrail apparatus disclosed herein can be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to handrail apparatus. In some examples, the handrail apparatus may be installed and/or coupled to monuments (e.g., walls) of vehicles such as aircraft, ground vehicles, busses, planes, recreational vehicles, etc. Because such vehicles have limited aisle space, the example handrail apparatus are movable between a stowed and/or first position and a deployed and/or second position. In some examples, in the deployed position, the handrail gripping portion extends into an aisle to assist passengers in transitioning and/or moving within the vehicle. In some examples, in the stowed position, the handrail gripping portion may be immediately adjacent and/or received within the monuments to enable food carts, etc. to easily pass through the aisle and/or for the handrail gripping portion to have a relatively thin profile. As set forth herein, a relatively thin profile means an envelope of the handrail gripping portion is within approximately two inches of a surface to which the handrail gripping portion is pivotably coupled. For example, in the stowed position, the handrail gripping portion may extend into an aisle approximately 1.5 inches and/or 0.75 inches.

In some examples, the example handrail apparatus includes a first coupling plate and/or portion, second coupling plates, posts and/or portions, a handrail gripping portion and latching mechanisms and/or supports. The first and second coupling plates, which may or not be integral, may be coupled to a monument of the vehicle. The monument may be a wall of a galley area, a storage area, a closet, a lavatory, etc. In some examples, the first coupling plate is pivotably coupled to a first end and/or lower portion of the handrail gripping portion via a hinge (e.g., a piano-type hinge). In some examples, first ends of the supports are positioned within respective slots of the second coupling plates to slidably and/or pivotably couple the supports to the second coupling plates. In some examples, second ends of the supports are positioned within respective curved slots of the handrail gripping portion to slidably and/or pivotably couple the supports to the hand rail. In some examples, the slots are defined by contoured cammed surfaces of the handrail gripping portion.

In some examples, to deploy the handrail gripping portion, the supports are released from a first locked and/or secured position to enable the second support ends to upwardly move within the curved slots of the handrail gripping portion toward a second locked and/or secured position. As the second support ends move toward the second position, a second end and/or upper portion of the handrail gripping portion outwardly moves from the monument such that a longitudinal axis of the handrail gripping portion is substantially parallel to a surface of the monument. As set forth herein, the phrase "substantially parallel" means within about 10 degrees of parallel and/or accounts for manufacturing tolerances. In some examples, as the second support ends move toward the second position, the first support ends slidably move away from an end (e.g., an upper end) of the second coupling plate slots to enable the handrail gripping portion to fully extend from the monument and/or the supports to be positioned at approximately a forty-five degree angle relative to a surface of the monument. In some examples, the supports may be released from the secured position by moving a hook, a stop, a lock, or a combination thereof that otherwise prevents the supports from moving freely within the curved slots of the handrail gripping portion. In some examples, the supports are biased (e.g., from the first position to the second position) by one or more springs.

In some examples, to stow the handrail gripping portion, the supports are released from the second position to enable the second support ends to move downwardly within the curved slots of the handrail gripping portion toward the first position. As the second support ends move toward the first position, the upper portion of the handrail gripping portion moves inwardly toward the monument such that the longitudinal axis of the handrail gripping portion is substantially parallel to a surface of the monument. In some examples, as the second support ends move toward the first position, the first support ends slidably move toward an end (e.g., an upper end) of the second coupling plate slots to enable the handrail gripping portion to be positioned immediately adjacent to the monument, have a relatively thin profile and/or for surfaces of the supports facing a surface of the monument to be substantially parallel to the surface of the monument.

FIG. 1 illustrates an example aircraft 100 that may include example handrail apparatus in accordance with the teachings of this disclosure. In some examples, the handrail apparatus are movable between a stowed position and/or configuration and a deployed position and/or configuration.

Figure 2:
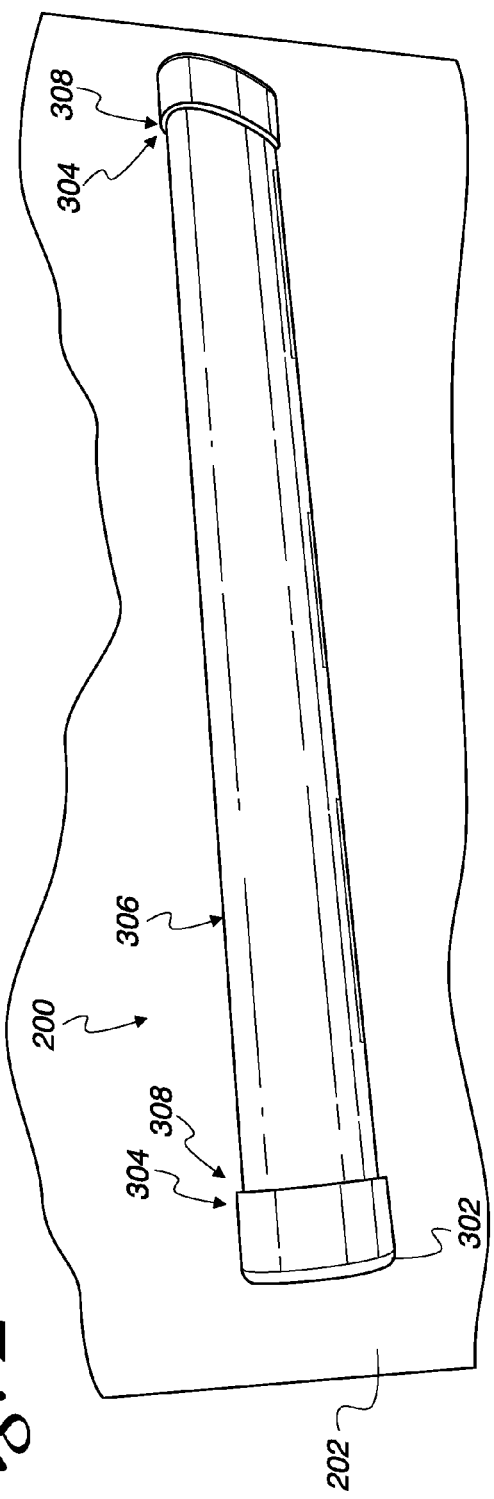
Figure 3:
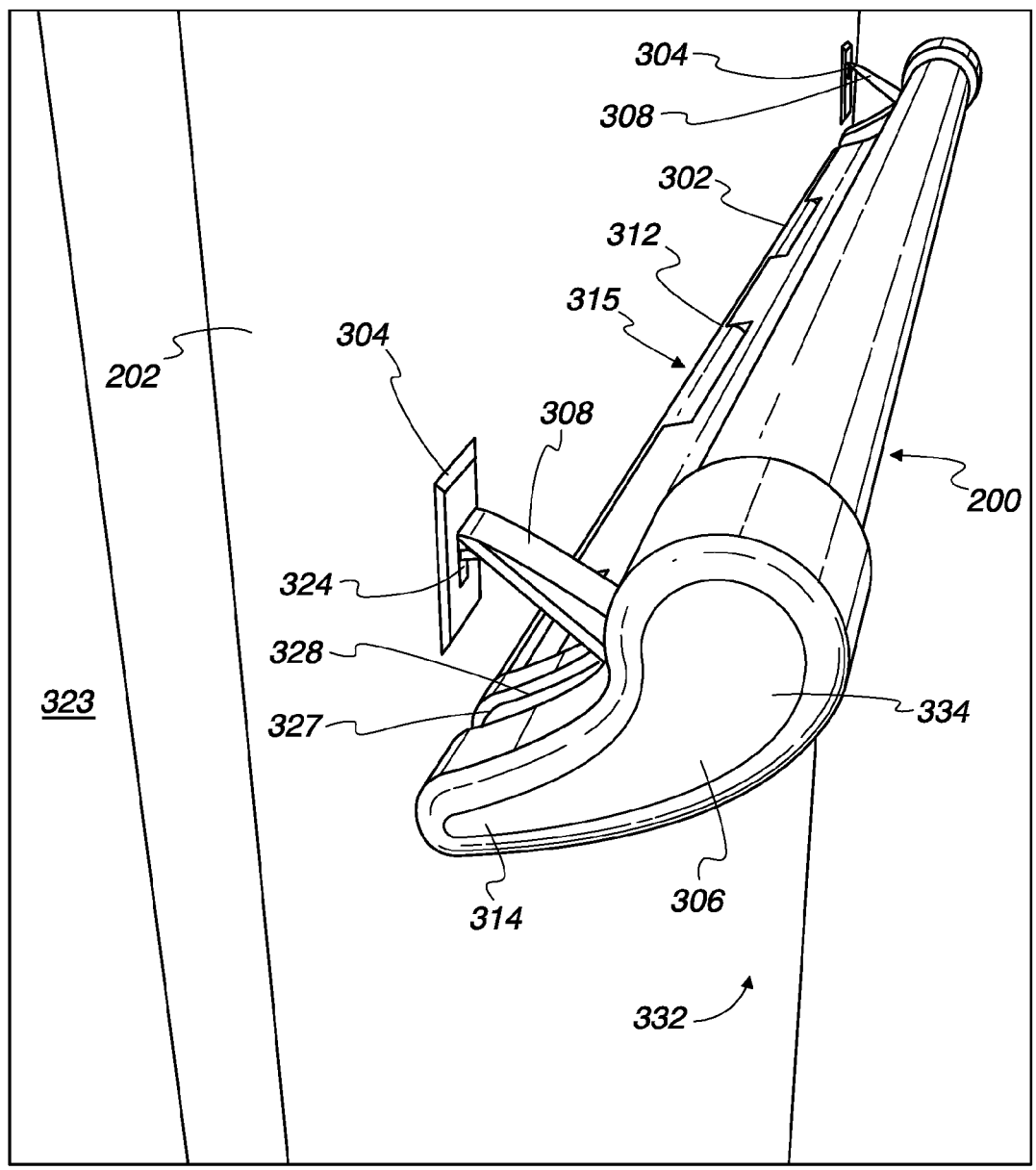
Figure 4:
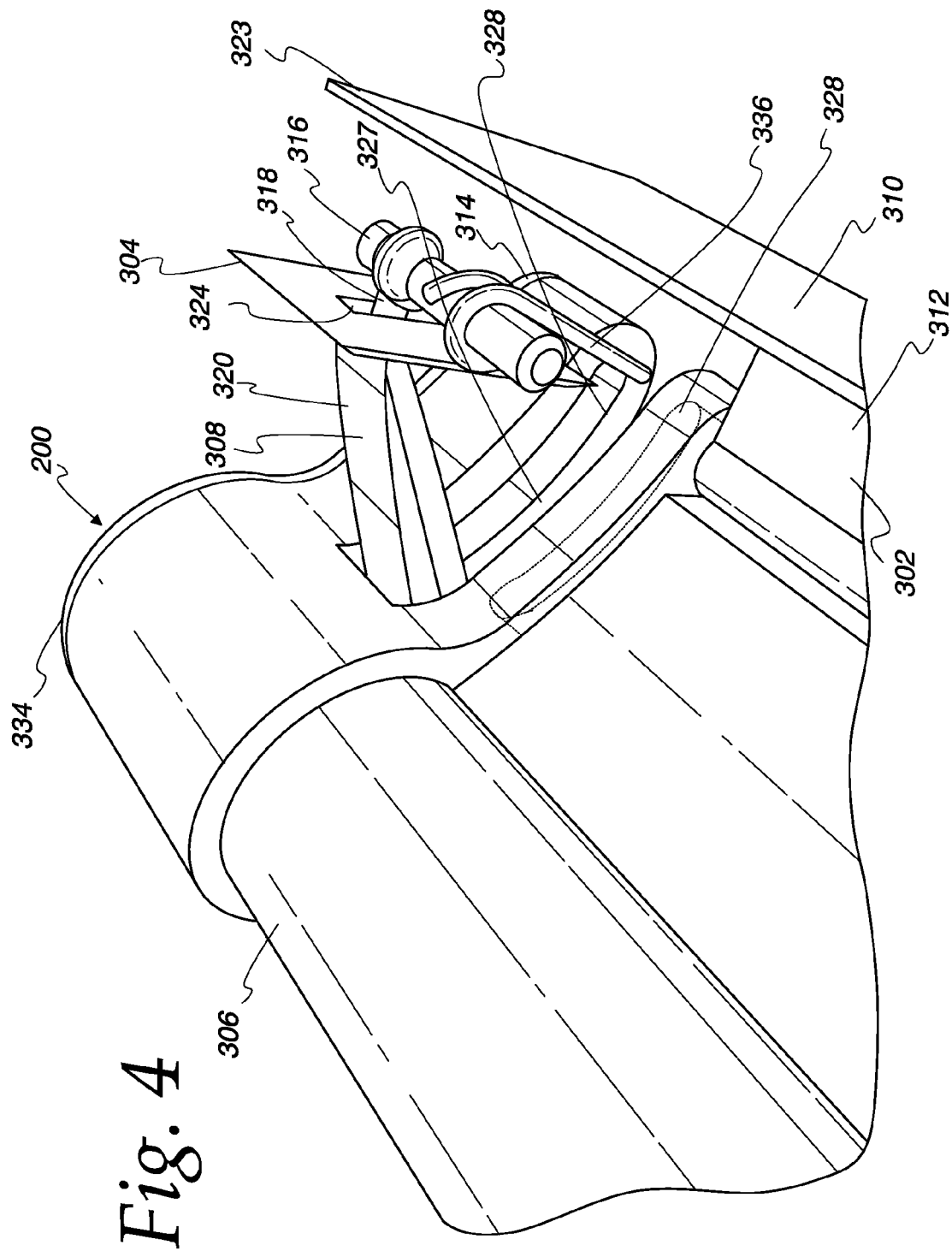

FIGS. 2-10 depict an example handrail apparatus 200 coupled to a monument 202 that may be a wall of a galley area, a storage area, a closet, a lavatory, etc. FIGS. 2-10 show the handrail apparatus 200 being moved from a first and/or stowed position to a second and/or deployed position. As shown in FIGS. 2-4, the example handrail apparatus 200 includes a first coupling plate, post and/or portion 302, second coupling plates, posts and/or portions 304, a handrail gripping portion 306, and latching mechanisms and/or supports 308. The first and second coupling plates 302, 304 are coupled to the monument 202. The first coupling plate 302 includes a first portion 310 (FIG. 4) and a second portion 312 that extends substantially perpendicularly from the first portion 310. In the illustrated example, the second portion 312 is pivotably coupled to a first end and/or lower portion 314 of the handrail gripping portion 306 via a hinge (e.g., a piano-type hinge) 315.

In some examples, the supports 308 include first through fourth portions 316, 318, 320, and 322. The first support portions and/or ends 316 (FIG. 4) are positioned on a first side 323 of the second coupling plate 304. The second support portions 318 extend through respective slots 324 of the second coupling plates 304. In some examples, at least a portion of the first and third support portions 316, 320 are wider than the slots 324 to substantially retain the second support portions 318 within the slots 324. The third support portions 320 are movably positioned within respective slots and/or grooves 327 (See FIGS. 6 and 8) of the handrail gripping portion 306. The fourth support portions and/or ends 322 are positioned within respective curved and/or arched grooves and/or slots 328 (See FIGS. 6 and 8) of the handrail gripping portion 306. In some examples, the first and fourth support portions 316, 322 are substantially parallel to one another. In some examples, the fourth support portions 322 include nylon (e.g., a nylon coating) to decrease the resistance between the supports 308 and the handrail gripping portion 306.

Figure 5:
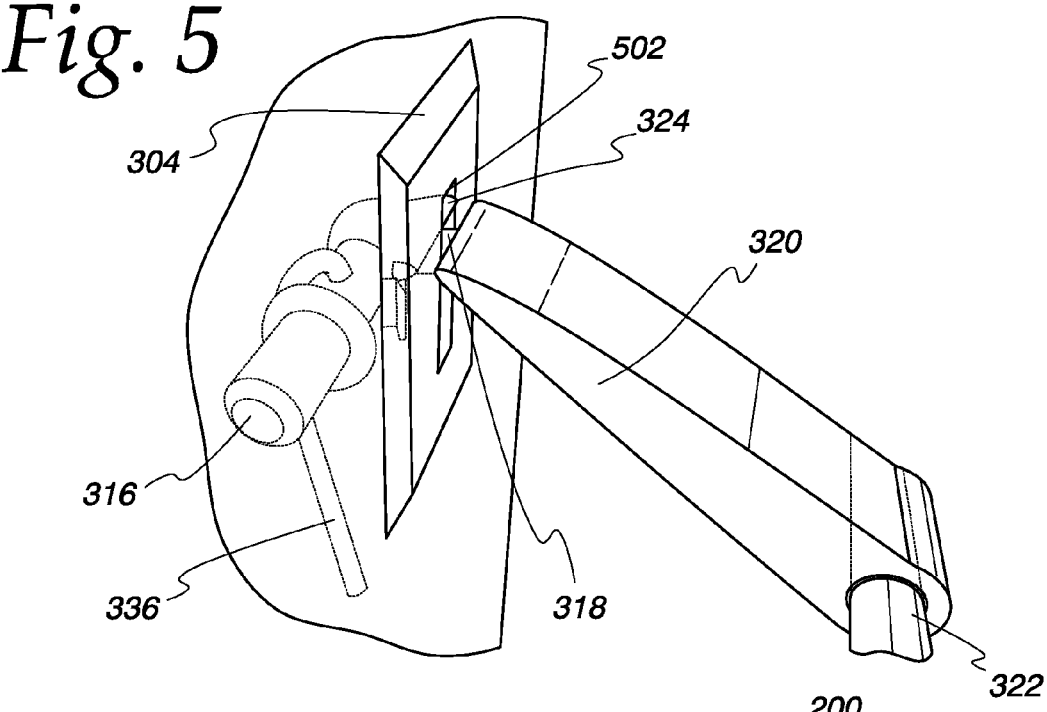
Figure 6:
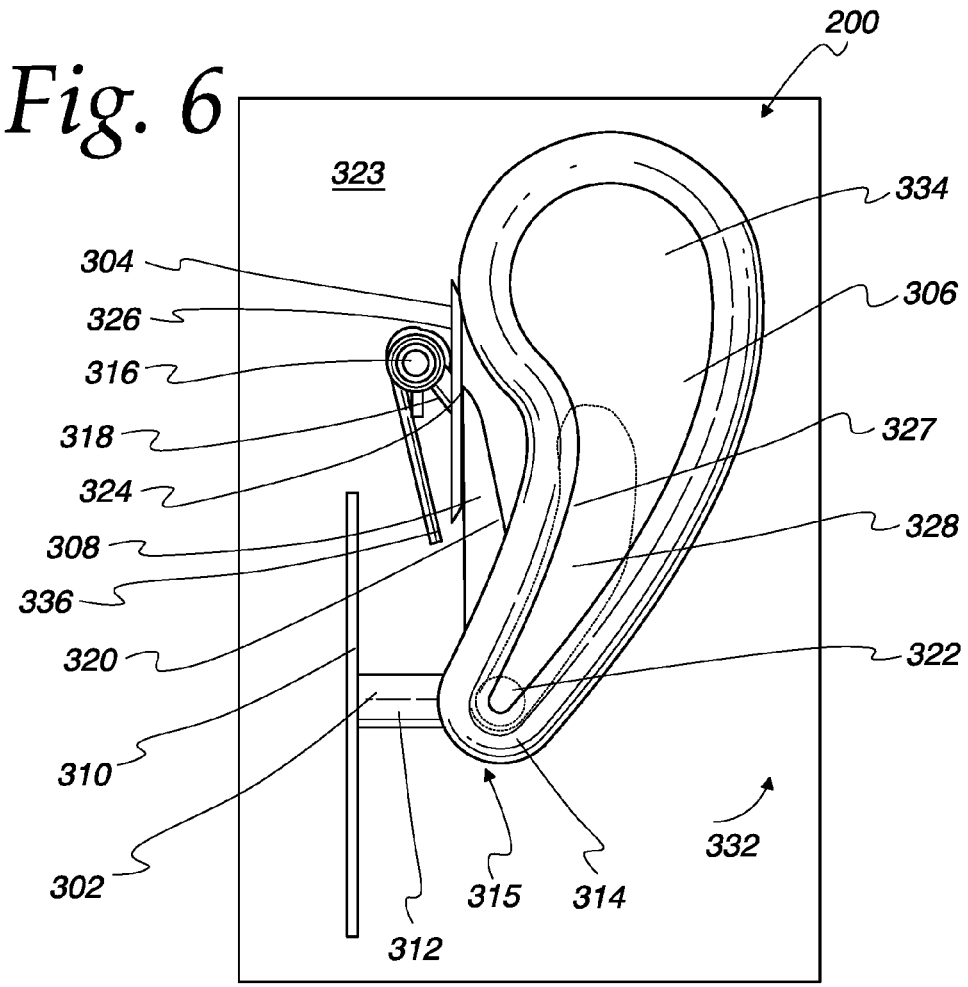

In some examples and as shown in FIGS. 3-5, to deploy the handrail gripping portion 306, the supports 308 are released from a first locked and/or secured position to enable the fourth support portions 322 to move within the curved slots 328 in a direction generally indicated by arrow 332 toward a second locked and/or secured position. As the fourth support portions 322 move toward the second position, a second end and/or upper portion 334 of the handrail gripping portion 306 moves outwardly from the monument 202 in a direction generally indicated by arrow 702 (FIG. 7). In some examples, as the fourth support portions 322 move toward the second position, the first support portions 316 slidably move away from an end (e.g., an upper end) 502 (FIG. 5) of the slots 324 to enable the handrail gripping portion 306 to extend fully from the monument 202 and/or the third support portions 320 to be positioned at approximately a forty-five degree angle relative to the first coupling plate first portion 310.

In some examples, the supports 308 may be released from the secured position by moving a stop, a lock, a securing apparatus, or a combination thereof that prevents the supports 308 from freely moving within the curved slots 327, or 328, or a combination thereof of the handrail gripping portion 306. The securing apparatus may include a hook that is rotatably biased toward a secured position. In some examples, as the fourth support portions 322 move toward the second position, the fourth support portions 322 may rotate the hook. As the fourth support portions 322 move toward the deployed position, the hook may rotate back and receive a portion of the fourth support portion 322. In some examples, the supports are biased (e.g., from the first position to the second position) by one or more springs 336 (FIG. 4).

In some examples and as shown in FIGS. 3-5, to stow the handrail gripping portion 306, the supports 308 are released from the second position to enable the fourth support portions 322 to move within the curved slots 328 in a direction generally indicated by arrow 1002 (FIG. 10) toward the first position. In some examples, the supports 308 are released by moving the hook of the securing apparatus longitudinally (FIG. 16) to enable the hook to exit an opening of the fourth support portions 322 as the supports 308 move toward the stowed position. As the fourth support portions 322 move toward the first position, the upper portion 334 of the handrail gripping portion 306 inwardly moves toward the monument 202 in a direction generally indicated by arrow 704 (FIG. 7). In some examples, as the fourth support portions 322 move toward the first position, the first support portions 316 slidably move toward the end 502 (FIG. 5) of the slots 324 to enable the handrail gripping portion 306 to be immediately adjacent to the monument 202, have a relatively thin profile and/or for the third support portions 320 to be positioned substantially parallel to the first coupling plate first portion 310.

Figure 13:
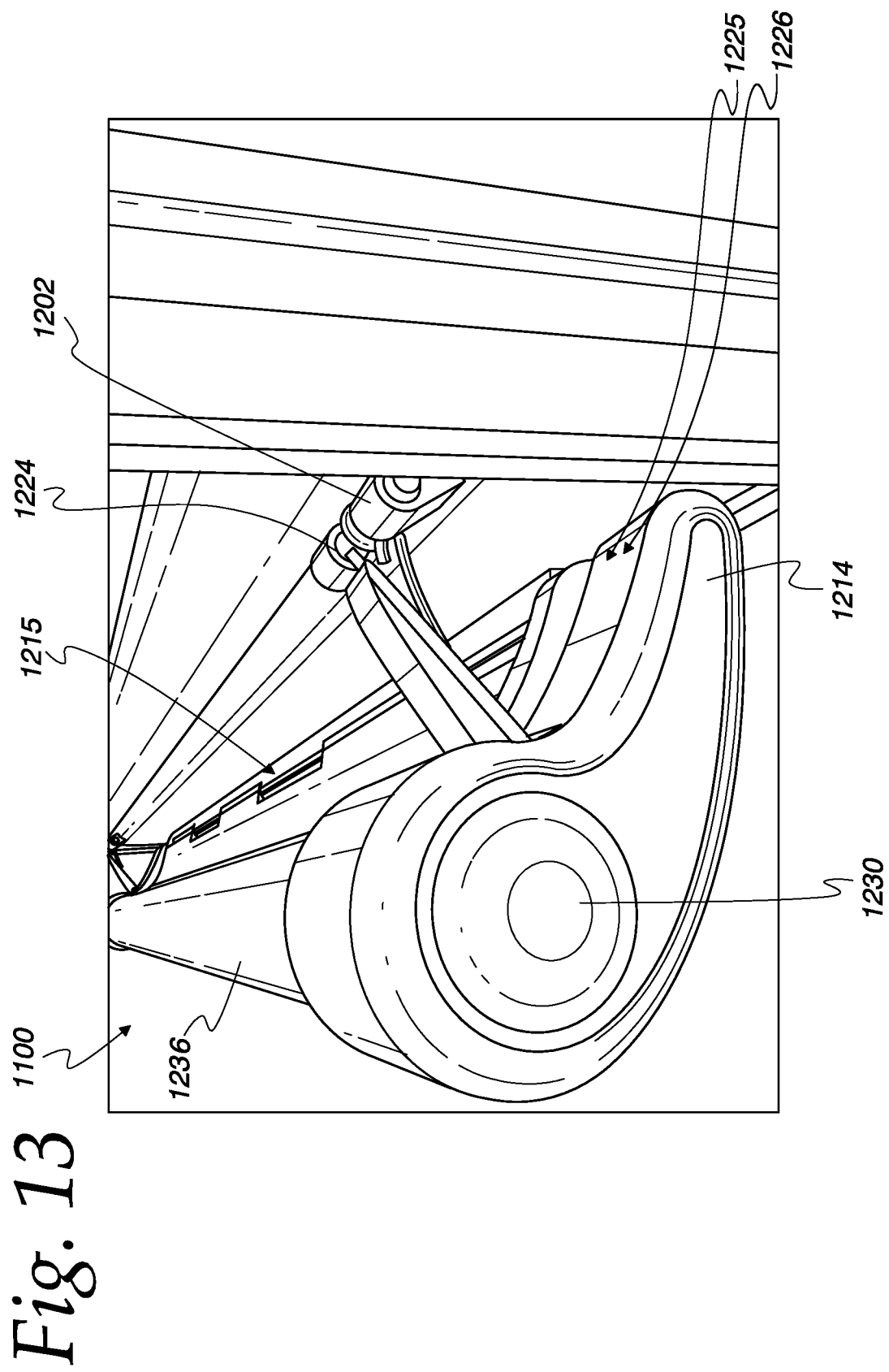
Figure 14:
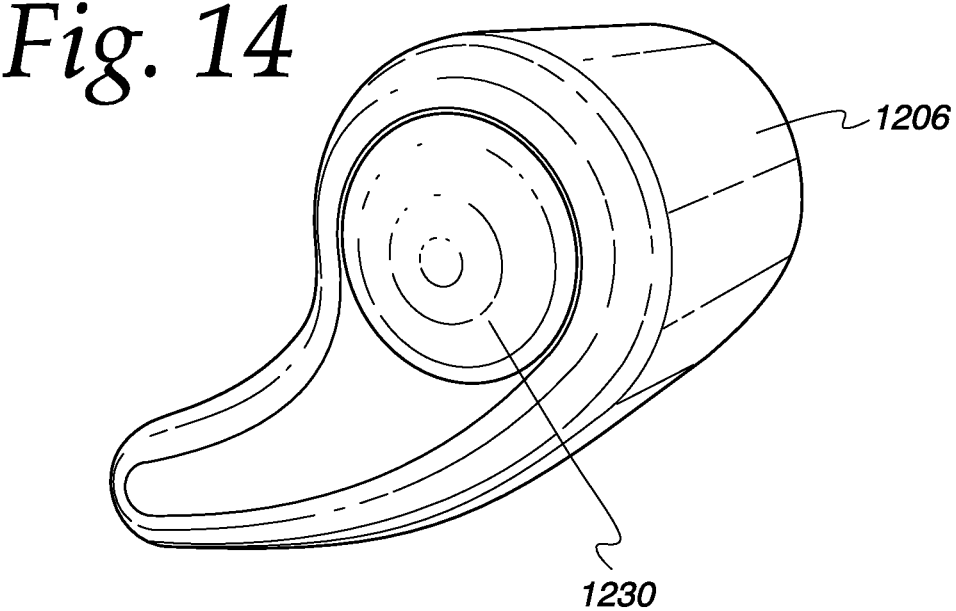
Figure 15:
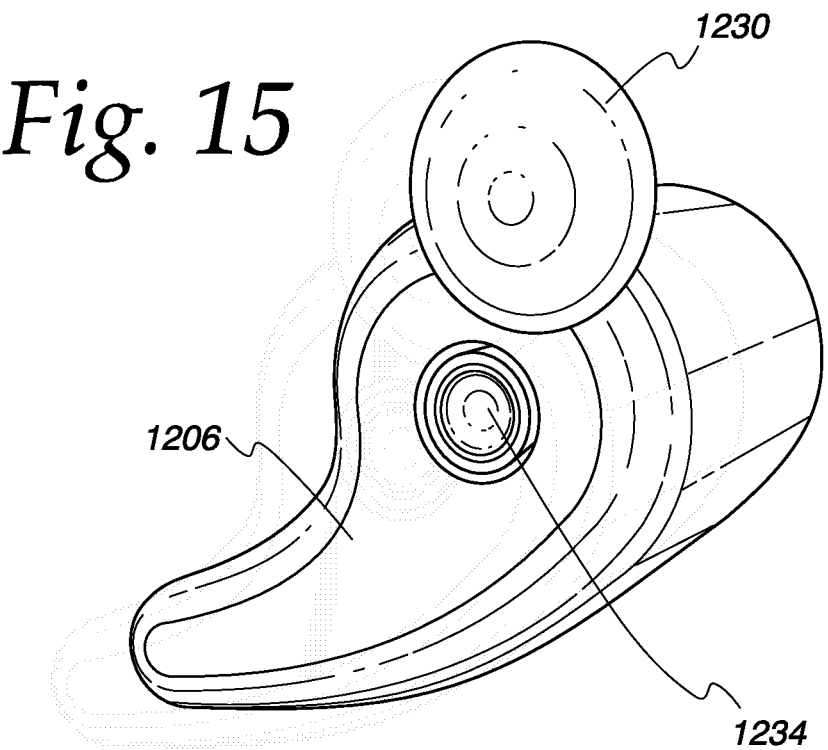

FIGS. 11-13 depict an example handrail apparatus 1100 coupled to a monument 1102 that may be a wall of a galley area, a storage area, a closet, a lavatory, etc. FIGS. 11-13 show the example handrail apparatus 1100 being moved from a first and/or stowed position to a second and/or deployed position. As shown in FIG. 12, the example handrail apparatus 1100 includes a first coupling plate and/or portion 1202, a second coupling plate and/or portion 1204, a handrail gripping portion 1206, and latching mechanisms and/or supports 1208. The first and second coupling plates 1202, 1204 are coupled to the monument 1102. The first coupling plate 1202 includes a first portion 1210 and a second portion 1212 that extends substantially perpendicularly from the first portion 1210. In the illustrated example, the second portion 1212 is pivotably coupled to a first end and/or lower portion 1214 of the handrail gripping portion 1206 via a hinge (e.g., a piano-type hinge) 1215 (See FIG. 13).

In some examples, the supports 1208 include first through fourth portions 1216, 1218, 1220, and 1222. The first support portions 1216 are positioned in an aperture 1224 (See FIG. 13) of the second coupling plate 1204 and are positioned perpendicularly relative to the second support portions 1218. The third support portions 1220 are movably positioned within respective slots and/or grooves 1225 of the handrail gripping portion 1206. The fourth support portions 1222 are positioned within respective curved and/or arched grooves and/or slots 1226 of the handrail gripping portion 1206. In some examples, the first and fourth support portions 1216, 1222 are substantially parallel to one another. In some examples, the supports 1208 are biased (e.g., from the first position to the second position) by one or more springs 1229.

In some examples and as shown in FIGS. 11-15, to deploy the handrail gripping portion 1206, a cover 1230 may be pivoted about a pivot point 1232 to enable access to a release button 1234. In the illustrated example, pressing the release button 1234 releases the supports 1208 and enables the fourth support portions 1222 to move within the curved slots 1226 in a direction generally indicated by arrow 1235 toward a second locked and/or secured position. As the fourth support portions 1222 move toward the second position, a second end and/or upper portion 1236 of the handrail gripping portion 1206 moves outwardly from a recess 1237 defined by the second coupling plate 1204 in a direction generally indicated by arrow 1238. In some examples, the second end 1236 that is received in the recess 1237 is an inwardly facing contoured surface. In some examples, in the deployed position, the third support portions 1220 are positioned at approximately a forty-five degree angle relative to the first coupling plate first portion 1210.

In some examples and as shown in FIGS. 11-13, to stow the handrail gripping portion 1206, the supports 1208 are released from the second position to enable the fourth support portions 1222 to move within the curved slots 1226 in a direction generally indicated by arrow 1240 toward the first position. As the fourth support portions 1222 move toward the first position, the upper portion 1236 of the handrail gripping portion 1206 moves inwardly toward the monument 1102 in a direction generally indicated by arrow 1242 to be at least partially received within the recess 1237.

Figure 16:
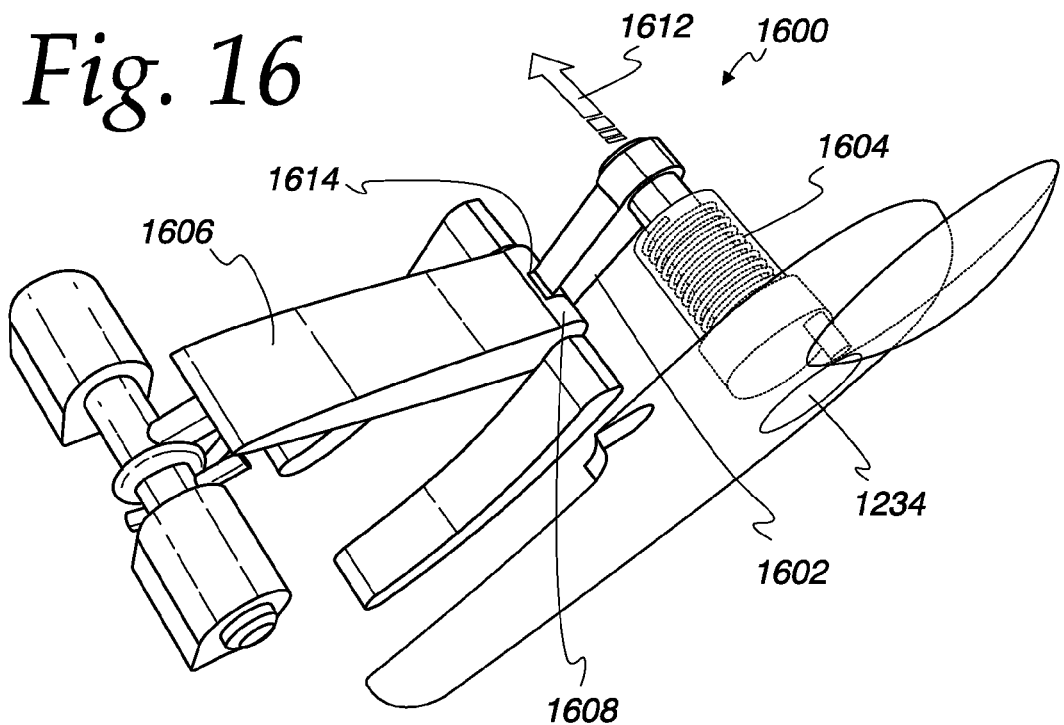
FIGS. 16 and 17 depict an example lock to secure the example handrail apparatus in the deployed position.
Figure 17:
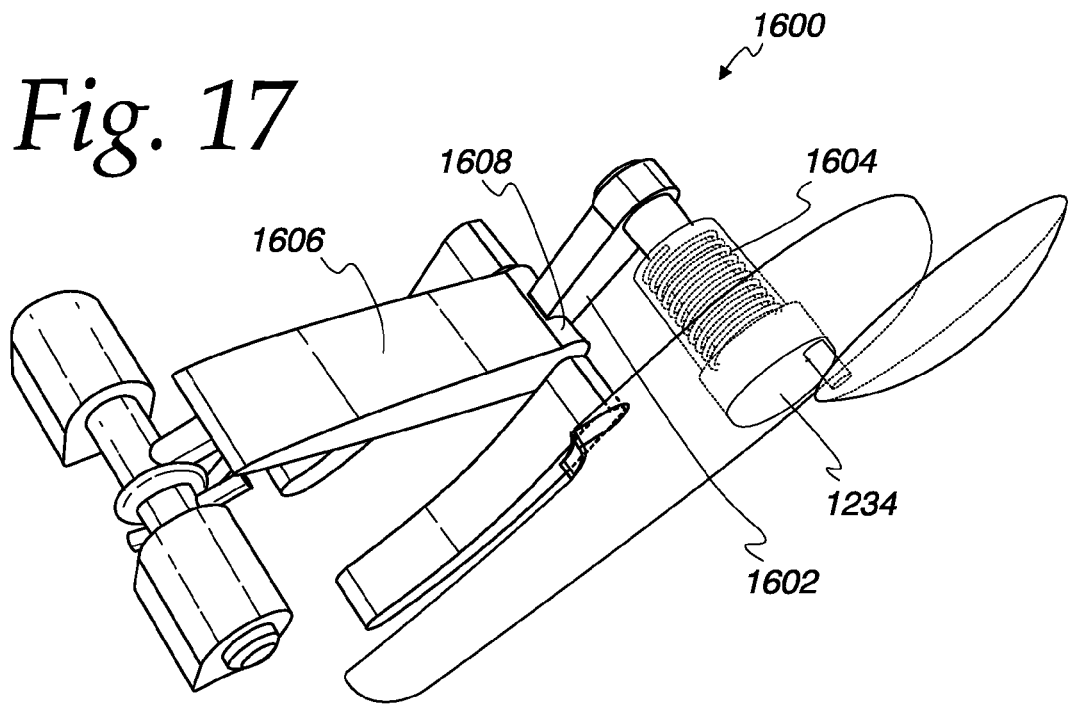

FIGS. 16 and 17 depict an example lock 1600 coupled to the release button 1234 that can be used to implement the examples disclosed herein. The lock 1600 includes a hook 1602 that is rotatably biased by a spring 1604 toward the secured position. In some examples, the support 1606 moves and/or rotates the hook 1602 as a support 1606 is moved toward the second position. Once the support 1606 is in a fully deployed position, the hook 1602 rotates back and receives an end and/or portion 1608 of the support 1606 (FIG. 17). In some examples, a contour of the portion 1608 corresponds to a contour and/or curved surface of the hook 1602 that receives the portion 1608. To release the support 1606 from the deployed position, the release button 1234 is inwardly pushed in a direction generally indicated by arrow 1612 against a biasing force of the spring 1604 to position the hook 1602 within a groove 1614 of the support 1606 and enable the support 1606 to move to the first position (FIG. 16).

Figure 18:
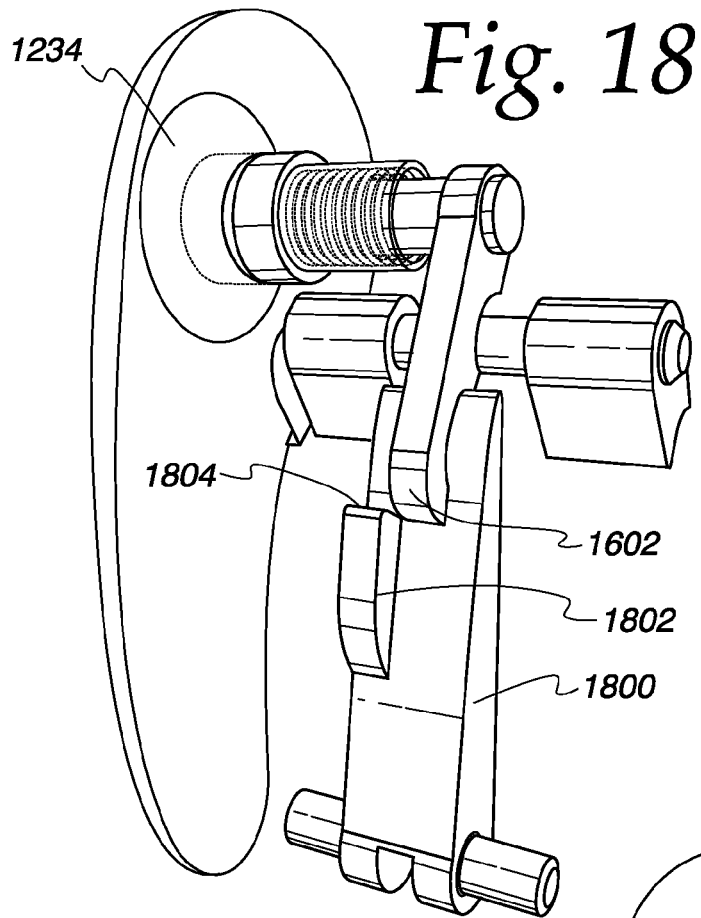
FIGS. 18 and 19 depict an example lock to secure the example handrail apparatus in the stowed position.
Figure 19:
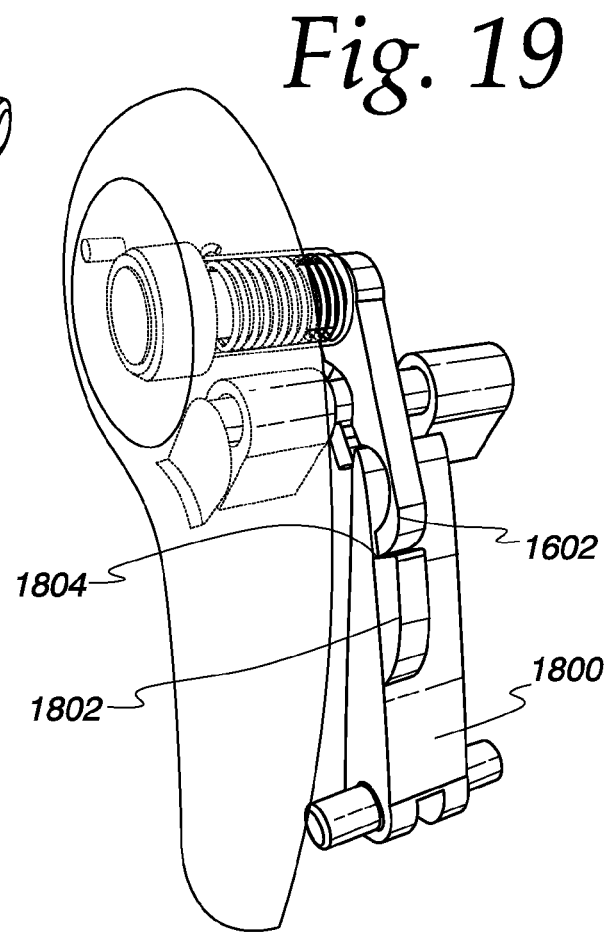

FIGS. 18 and 19 depict the example lock 1600 securing a support 1800 in the first position and/or stowed position. In some examples, as the support 1800 is moved toward the first position, an end of the hook 1602 engages and/or follows a tapered surface 1802 of the support 1800 until the hook 1602 receives and/or is positioned adjacent to a step and/or portion 1804 of the support 1800 (FIG. 19). In some examples, the portion 1804 has a contour and/or curved surface that corresponds to a contour and/or curved surface of the hook 1602. To release the support 1800 from the stowed position, the release button 1234 is inwardly pushed to position the hook 1602 at a distance from the step 1804 (FIG. 18) and enable the support 1800 to move to the second position.

Figure 20:
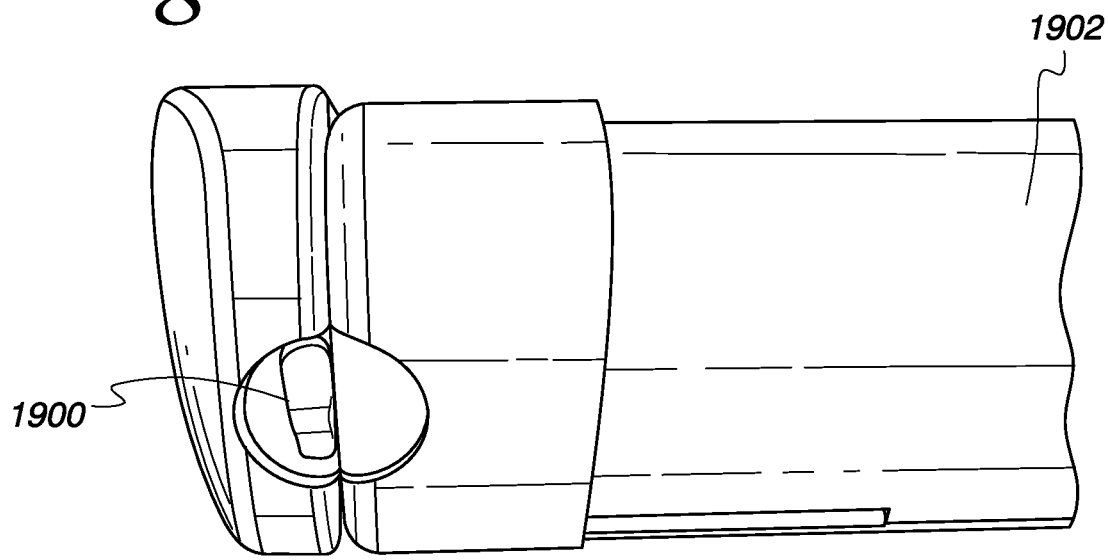
FIGS. 20 and 21 depict another example lock to secure the handrail apparatus in the stowed position.
Figure 21:
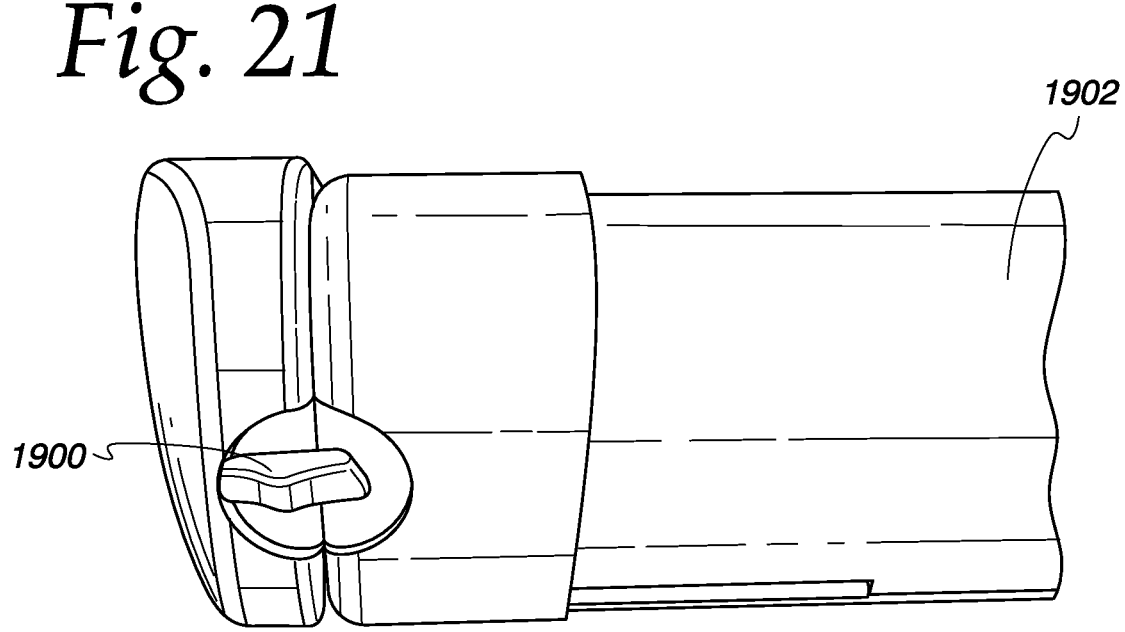

FIGS. 20 and 21 depict an example latch and/or lock 1900 that can be rotated between an unlocked position as shown in FIG. 20 and a locked position as shown in FIG. 21. In the unlocked position, the lock 1900 enables a handrail gripping portion 1902 to be moved from the stowed position and in the locked position the lock 1900 retains the handrail gripping portion 1902 in the stowed position.

As set forth herein, an example handrail apparatus for a vehicle (e.g. an aircraft) includes a handrail configured to provide a thin profile when in a stowed position. The handrail is movable between the stowed position and a deployed position. The handrail apparatus includes a plurality of latching mechanisms and a plurality of posts having a first end affixed to the handrail and a second end affixed to the plurality of latching mechanisms.

In some examples, the handrail includes slots to receive projections of the latching mechanisms. An interaction between the projections and the slots enables the latching mechanisms to be coupled to the handrail. In some examples, the latching mechanisms are pivotably and slidably coupled to the handrail. In some examples, the handrail or the latching mechanisms, or a combination thereof include a lock to secure the handrail in the stowed position or the deployed position, or a combination thereof. In some examples, the lock includes a hook to receive a portion of one of the latching mechanisms. In some examples, the posts are to be coupled to a monument of a vehicle (e.g. an aircraft). In some examples, the handrail is pivotably coupled to the posts and the latching mechanisms are pivotably and slidably coupled to the posts.

In some examples, an apparatus includes a first coupling plate to be coupled to a monument of a vehicle and a second coupling plate to be coupled to the monument of the vehicle. The apparatus includes a gripping portion coupled to the first coupling plate and a support coupled to the second coupling plate and the gripping portion. The gripping portion is movable between a stowed position and a deployed position. In some examples, a lock release is disposed at an end of the gripping portion, the lock release is actuatable to enable the support to be released from being secured in the deployed position.

In some examples, the vehicle includes an aircraft. In some examples, the support is movably coupled within a slot defined by contoured cammed surfaces of the gripping portion. In some examples, the gripping portion is secured, via a lock, in the stowed position or the deployed position, or a combination thereof. In some examples, the lock substantially prevents the supports from moving within the slot. In some examples, the lock is movable between a locked position and an unlocked position via a button. In some examples, the lock includes a rotatably biased hook to receive a portion of the support. In some examples, the hook is movable relative to a longitudinal axis of the gripping portion to the unlocked position. In some examples, in the stowed position, a portion of the gripping portion is received in a recess of the second coupling plate. In some examples, the first coupling plate and the second coupling plate are integral.

An example method for operating a handrail apparatus includes disengaging a plurality of latching mechanisms, pivoting a gripping portion of the handrail apparatus about a fixed axis from a stowed position to a deployed position and engaging the plurality of latching mechanisms to lock the gripping portion in the deployed position. In some examples, disengaging the plurality of latching mechanisms includes moving a cover and moving a lock to an unlocked position. In some examples, the method includes after engaging the plurality of latching mechanism to lock the gripping portion in the deployed position, disengaging the plurality of latching mechanisms, pivoting the gripping portion about the fixed axis from the deployed position to the stowed position, and engaging the plurality of latching mechanisms to lock the gripping portion in the stowed position.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A handrail apparatus couplable to a monument of an aircraft, comprising:
    a handrail providing a thin profile when in a stowed position, the handrail being movable about a pivot between the stowed position and a deployed position, the pivot disposed at an end of the handrail, the pivot to be coupled to the monument;
    first and second latching mechanisms coupled to the handrail, as the handrail is moved from the stowed position to the deployed position, ends of the respective latching mechanisms are to move along a contoured path within the handrail, the contoured path extending relative to a plane that extends along a longitudinal axis of the handrail, the contoured path being spaced apart from the pivot, wherein the handrail comprises first and second opposing slots to receive projections of the first and second latching mechanisms, an interaction between the projections and the first and second opposing slots enables the projections to be retained within the slots and for the latching mechanisms to be coupled to the handrail; and
    a biasing element being disposed at a distal end of the respective latching mechanisms to urge the handrail toward at least one of the stowed position or the deployed position, the distal end and the biasing element to be immediately adjacent the moment, the distal end being spaced apart from the projections.

2. The handrail apparatus of claim 1, wherein the latching mechanisms are at least one of pivotably or slidably coupled to the handrail.

3. The handrail apparatus of claim 1, wherein at least one of the handrail or the latching mechanisms comprise a lock to secure the handrail in at least one of the stowed position or the deployed position.

4. The handrail apparatus of claim 1, further including a biased lock to receive the end of at least one of the latching mechanisms when the handrail is in the deployed position, as the handrail is moved from the stowed position to the deployed position, the end of the at least one of the latching mechanisms moves the lock from a locked position to an unlocked position to enable the handrail to be positioned in the deployed position and for the end of the at least one of the latching mechanisms to be received by the lock to secure the handrail in the deployed position.

5. The handrail apparatus of claim 1, further including posts having a first end affixed to the handrail and a second end affixed to the latching mechanisms, the posts are to be coupled to the monument of the aircraft.

6. The handrail apparatus of claim 5, wherein the handrail is pivotably coupled to the posts, the latching mechanisms being at least one of pivotably or slidably coupled to the posts.

7. The handrail apparatus of claim 1, wherein the plane bifurcates the pivot to define a first portion of the handrail and a second portion of the handrail, a first width of the first portion at an end of the handrail being greater than a second width of the second portion at the end of the handrail to enable the first portion to be received within a recess of the monument to which the handrail apparatus is to be coupled.

8. The handrail apparatus of claim 1, wherein the projections include a synthetic polymer to reduce resistance between the latching mechanisms and the handrail as the handrail is moved from the stowed position to the deployed position.

9. The handrail apparatus of claim 1, wherein the projections extend substantially perpendicularly relative to longitudinal axes of the respective latching mechanisms to enable the projections to be retained within the slots.

10. The handrail apparatus of claim 1, further including a bracket to be coupled to the monument, the handrail and the bracket forming the pivot.

11. A handrail; comprising:
    a first coupling plate to be coupled to a monument of a vehicle;
    a second coupling plate to be coupled to the monument of the vehicle;
    a gripping portion coupled to the first coupling plate;
    a support coupled to the second coupling plate, a first end of the support being positionable within a slot of the gripping portion between a first position and a second position, the slot to receive projections of the support, an interaction between the projections and the slot enables the projections to be retained within the slot and for the support to be coupled to the gripping portion, the first position being adjacent a second end of the slot, the second position being adjacent a third end of the slot, the gripping portion being movable between a stowed position and a deployed position, when the gripping portion is in the stowed position, the first end of the support is disposed at the second end of the slot, when the gripping portion is in the deployed position, the first end of the support is disposed at the third end of the slot; and
    a biasing element being disposed at a distal end of the support to urge the gripping portion toward at least one of the stowed position or the deployed position, the distal end and the biasing element to be immediately adjacent the moment, the distal end being spaced apart from the projections.

12. The handrail of claim 11, further comprising the vehicle, wherein the vehicle is an aircraft.

13. The handrail of claim 11, further including a lock at the second end of the slot or the third end of the slot, the lock to receive the first end of the support to secure the support in at least one of the stowed position or the deployed position.

14. The handrail of claim 13, further including a lock release disposed at an end of the gripping portion, the lock release being actuatable to enable the support to be released from being secured in the deployed position.

15. The handrail of claim 13, wherein the lock is movable between a locked position and an unlocked position via a button.

16. The handrail of claim 11, further including a rotatably biased catch to catch the first end of the support as the support moves from the deployed position to the stowed position, when the gripping portion is in the stowed position, the catch abuts against a step of the support to deter the support and the gripping portion from moving from the stowed position.

17. The handrail of claim 11, further including a catch disposed within the gripping portion, the catch being movable relative to a longitudinal axis of the gripping portion between a locked position and an unlocked position, in the locked position, the catch to catch the first end of the support to secure the support and the gripping portion in the stowed position, in the unlocked position, the catch to enable the support and the gripping portion to move from the stowed position to the deployed position.

18. The handrail of claim 11, wherein, in the stowed position, a bulbous portion of the gripping portion is received in a recess of the first coupling plate.

19. The handrail of claim 11, wherein the first coupling plate and the second coupling plate are integral.

20. The handrail of claim 11, further comprising the monument, wherein a longitudinal axis of the gripping portion is to be substantially parallel to a surface of the monument.

* * * * *